(12) United States Patent
Kinoshita

(10) Patent No.: US 9,042,633 B2
(45) Date of Patent: May 26, 2015

(54) RECORDING MEDIA PROCESSING DEVICE, CONTROL METHOD OF A RECORDING MEDIA PROCESSING DEVICE, AND NON-TRANSITORY STORAGE MEDIUM

(71) Applicant: SEIKO EPSON CORPORATION, Tokyo (JP)

(72) Inventor: Yoshiaki Kinoshita, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 142 days.

(21) Appl. No.: 13/938,480

(22) Filed: Jul. 10, 2013

(65) Prior Publication Data
US 2014/0023262 A1 Jan. 23, 2014

(30) Foreign Application Priority Data

Jul. 18, 2012 (JP) ................................. 2012-159321

(51) Int. Cl.
*G06K 9/00* (2006.01)
*G06K 9/18* (2006.01)

(52) U.S. Cl.
CPC ....................................... *G06K 9/186* (2013.01)

(58) Field of Classification Search
CPC G06K 9/186; G06K 17/00; G06K 2017/0038
See application file for complete search history.

(56) References Cited

U.S. PATENT DOCUMENTS

| 5,347,593 A | * | 9/1994 | Klinefelter | 382/207 |
| 6,327,378 B1 | * | 12/2001 | Ball | 382/137 |
| 6,956,962 B1 | * | 10/2005 | Hayosh | 382/139 |
| 8,121,384 B2 | | 2/2012 | Nakamura | |
| 8,184,895 B2 | * | 5/2012 | Nakamura | 382/139 |

FOREIGN PATENT DOCUMENTS

| JP | 9311906 A | 12/1997 |
| JP | 2004206362 A | 7/2004 |
| JP | 2009169712 A | 7/2009 |
| JP | 201154029 A | 3/2011 |
| JP | 201154030 A | 3/2011 |
| JP | 2012159912 A | 8/2012 |
| JP | 2012168837 A | 9/2012 |
| JP | 2012174093 A | 9/2012 |
| JP | 2012185762 A | 9/2012 |
| JP | 2012185763 A | 9/2012 |
| JP | 2012198852 A | 10/2012 |
| JP | 2012221276 A | 11/2012 |
| JP | 2012221337 A | 11/2012 |
| JP | 2012226633 A | 11/2012 |
| JP | 2012243063 A | 12/2012 |
| JP | 2012252560 A | 12/2012 |

* cited by examiner

*Primary Examiner* — Tom Y Lu
(74) *Attorney, Agent, or Firm* — Lowe Hauptman & Ham, LLP

(57) ABSTRACT

The recognition rate is improved while suppressing the processing time. The character recognition unit 80 of a check reader 1 uses two sets of reference waveform data, data for printing method 1 and data for printing method 2, in combination with modifying the reference waveform data in two ways, sliding the reference waveform data or scaling the reference waveform data according to variation in the line width of the magnetic ink character 101, to execute four candidate selection processes. If the same character is selected as a candidate by the first three of the four selection process combinations, the remaining one of the four processes is limited to using the reference waveform data for the selected candidate character.

12 Claims, 8 Drawing Sheets

BOLD LINE ··· REFERENCE WAVEFORM DATA
THIN LINE ··· CHARACTER WAVEFORM DATA

RECORDING MEDIA PROCESSING DEVICE, CONTROL METHOD OF A RECORDING MEDIA PROCESSING DEVICE, AND NON-TRANSITORY STORAGE MEDIUM

This application claims priority under 35 U.S.C. §119 to Japanese Patent Application No. 2012-159321 filed on Jul. 18, 2012, the entire disclosure of which is expressly incorporated by reference herein.

BACKGROUND

1. Technical Field

The present disclosure relates to a recording media processing device, a method of controlling a recording media processing device, and a non-transitory storage medium storing a program.

2. Related Art

Recording media processing devices (check readers) that have a magnetic head for reading a magnetic ink character line (MICR line) recorded on checks and similar recording media, read the magnetic ink characters contained in the MICR line of the recording medium conveyed through a conveyance path, and recognize each magnetic ink character are known from the literature. See, for example, Japanese Unexamined Patent Appl. Pub. JP-A-2004-206362.

Recording media processing devices such as described in JP-A-2004-206362 extract character waveform data in a range corresponding to one magnetic ink character from signal waveform data acquired by reading a MICR line, compare the extracted character waveform data with reference waveform data for each character in the character set, recognize the magnetic ink character based on the difference between the character waveform data and the reference waveform data, and repeat this process to recognize each magnetic ink character.

In order to improve the recognition rate of magnetic ink character recognition, however, various comparison processes are required as part of the character recognition process. For example, the character waveform data read by the magnetic head for any single character can vary because the type of magnetic ink or the amount of magnetic ink that is printed, for example, can vary with the method of printing the magnetic ink on checks or other media. As a result, reference waveform data may be prepared specifically for different printing methods, and the character waveform data captured by the magnetic head may be compared with two sets of reference waveform data prepared for two different printing methods. Comparison is also not limited to simply comparing the reference waveform data prepared for different printing methods with the character waveform data, and other comparison processes slide or scale the reference waveform data to adjust a waveform for comparison. The inventor has noted, while performing multiple comparison processes can be expected to improve the recognition rate, the large amount of data to be processed in each comparison process means that a long time is required to complete multiple comparison processes.

SUMMARY

The present discloser is directed to solving the foregoing problem as described in the following preferred embodiments.

At least of one embodiment is a recording media processing device including: a magnetic reading unit that magnetically reads a magnetic ink character recorded on a recording medium; a storage unit that stores reference waveform data for a plurality of characters and a specific threshold value; and a character recognition unit that compares character waveform data acquired by the magnetic reading unit reading the magnetic ink character with the reference waveform data read from the storage unit and calculates a difference therebetween, selects a candidate character for the read magnetic ink character based on the difference, and determines whether or not the candidate character is the magnetic ink character based on the difference and the specific threshold. When selecting the candidate character, the character recognition unit modifies reference waveform data for a plurality of printing methods in plural ways and compares the character waveform data with plural combinations of modified reference waveform data to select the candidate, and when a character selected as a candidate in at least two combinations is the same character, limits comparison in at least one remaining combination to the reference waveform data for the same character.

At least of one embodiment can improve the recognition rate by combining processes that modify reference waveform data in plural ways with reference waveform data for plural printing methods. If the same character is selected as a candidate character by at least two of the processes that are executed first, at least one remaining process is limited to the reference waveform data for the character selected as the candidate. Processing time can therefore be shortened compared with processing all of the reference waveform data in all combinations of processes. If the same character is selected as a candidate in plural processes, the possibility that the magnetic ink character is the selected candidate character is extremely high. The recognition rate can therefore be improved while suppressing the processing time required for the character recognition process.

In a recording media processing device according to at least of one embodiment, when the candidate is determined to not be the magnetic ink character based on the difference and the specific threshold, the character recognition unit selects the character of the reference waveform data with the smallest difference as a recognition character candidate, executes an additional process of comparing a specific part of the character waveform data and a specific part of the reference waveform data and selecting a candidate for the magnetic ink character, and when the character selected as the candidate in the additional process matches the character selected as the recognition character candidate, determines that the character selected as the recognition character candidate is the magnetic ink character.

When the magnetic ink character is not recognized in a preceding process, there is a strong possibility that the magnetic ink character is the character with the smallest difference in all of the processes, and the character with the smallest difference can be selected as a candidate. If an additional process that uses a different method of comparison is then executed, and the character selected as a candidate from the first processes is the same as the character selected as a recognition character candidate in the additional process, the candidate is recognized as the magnetic ink character and the recognition rate can be further improved.

In a recording media processing device according to at least of one embodiment, the character recognition unit modifies the reference waveform data in two ways, sliding the reference waveform data and scaling the reference waveform data according to the expansion or compression of the character width of the magnetic ink character, uses two sets of reference waveform data, reference waveform data for first printing method and reference waveform data for second printing method, as the reference waveform data for a plurality of printing methods, and sequentially executes a total of four selection processes, and if the same character is selected as a candidate in any three of the four selection processes that are executed first based on the reference waveform data for each character, limits the one selection process remaining of the four selection processes to comparing and processing reference waveform data for the same character.

At least of one embodiment improves the recognition rate by executing a total of four selection processes combining two different modification processes and two sets of reference waveform data. When the same character is selected as a candidate by the first three processes, the remaining one process is executed using only the reference waveform data for the selected candidate character. The processing time can therefore be shortened compared with executing all four process combinations using the reference waveform data for all characters. If the same character is selected as a candidate in three processes, the possibility that the magnetic ink character is the selected candidate character is extremely high. The recognition rate can therefore be improved while suppressing the processing time required for the character recognition process.

In a recording media processing device according to at least of one embodiment, in addition to the foregoing four process combinations, the character recognition unit scales the line width of the reference waveform data according to expansion or compression of the line width of the magnetic ink character, and sequentially executes two additional selection processes using two sets of reference waveform data, the reference waveform data for first printing method and the reference waveform data for second printing method; and after executing one of the two additional selection processes using the reference waveform data for each character, limits the other of the two additional selection processes to the reference waveform data for the character selected as a candidate in the one additional selection process.

At least of one embodiment improves the recognition rate by executing a process combining two additional processes in addition to the foregoing four selection processes. The second additional process is limited to the reference waveform data for the character selected as a candidate by the first additional process, and the processing time can therefore be shortened compared with executing the two additional combinations using the reference waveform data for all characters. The recognition rate can therefore be improved while suppressing the processing time required for the character recognition process.

At least of one embodiment is a method of controlling a recording media processing device that has a magnetic reading unit that magnetically reads a magnetic ink character recorded on a recording medium, a storage unit that stores reference waveform data for a plurality of characters and a specific threshold value, and a character recognition unit that compares character waveform data acquired by the magnetic reading unit reading the magnetic ink character with the reference waveform data read from the storage unit and calculates a difference therebetween, selects a candidate character for the read magnetic ink character based on the difference, and determines whether or not the candidate character is the magnetic ink character based on the difference and the specific threshold, the control method selecting a candidate character using steps including: modifying reference waveform data for a plurality of printing methods in plural ways and compares the character waveform data with plural combinations of modified reference waveform data to select the candidate; and when a character selected as a candidate in at least two combinations is the same character, limiting comparison in at least one remaining combination to the reference waveform data for the same character.

At least of one embodiment can improve the recognition rate by combining processes that modify reference waveform data in plural ways with reference waveform data for plural printing methods. If the same character is selected as a candidate character by at least two of the processes that are executed first, at least one remaining process is limited to the reference waveform data for the character selected as the candidate. Processing time can therefore be shortened compared with processing all of the reference waveform data in all combinations of processes. If the same character is selected as a candidate in plural processes, the possibility that the magnetic ink character is the selected candidate character is extremely high. The recognition rate can therefore be improved while suppressing the processing time required for the character recognition process.

A method of controlling a recording media processing device according to at least of one embodiment further includes steps of sequentially executing a total of four selection processes including modifying the reference waveform data in two ways, sliding the reference waveform data and scaling the reference waveform data according to the expansion or compression of the character width of the magnetic ink character, using two sets of reference waveform data, reference waveform data for first printing method and reference waveform data for second printing method, as the reference waveform data for a plurality of printing methods; and if the same character is selected as a candidate in any three of the four selection processes that are executed first based on the reference waveform data for each character, limiting the one selection process remaining of the four selection processes to comparing and processing reference waveform data for the same character.

At least of one embodiment improves the recognition rate by executing a total of four selection processes combining two different modification processes and two sets of reference waveform data. When the same character is selected as a candidate by the first three processes, the remaining one process is executed using only the reference waveform data for the selected candidate character. The processing time can therefore be shortened compared with executing all four process combinations using the reference waveform data for all characters. If the same character is selected as a candidate in three processes, the possibility that the magnetic ink character is the selected candidate character is extremely high. The recognition rate can therefore be improved while suppressing the processing time required for the character recognition process.

At least of one embodiment is a non-transitory storage medium storing a program executed by a control unit that controls parts of a recording media processing device that has a magnetic reading unit that magnetically reads a magnetic ink character recorded on a recording medium, a storage unit that stores reference waveform data for a plurality of characters and a specific threshold value, and a character recognition unit that compares character waveform data acquired by the magnetic reading unit reading the magnetic ink character with the reference waveform data read from the storage unit and calculates a difference therebetween, selects a candidate character for the read magnetic ink character based on the difference, and determines whether or not the candidate character is the magnetic ink character based on the difference and the specific threshold, the program selecting a candidate character using steps including: modifying reference waveform data for a plurality of printing methods in plural ways and compares the character waveform data with plural combinations of modified reference waveform data to select the candidate; and when a character selected as a candidate in at least two combinations is the same character, limiting comparison in at least one remaining combination to the reference waveform data for the same character.

At least of one embodiment can improve the recognition rate by combining processes that modify reference waveform data in plural ways with plural sets of reference waveform data. If the same character is selected as a candidate character by at least two of the processes that are executed first, at least one remaining process is limited to the reference waveform data for the character selected as the candidate. Processing time can therefore be shortened compared with processing all of the reference waveform data in all combinations of processes. If the same character is selected as a candidate in plural processes, the possibility that the magnetic ink character is the selected candidate character is extremely high. The recognition rate can therefore be improved while suppressing the processing time required for the character recognition process.

A program according to at least of one embodiment preferably also has steps of: sequentially executing a total of four selection processes including modifying the reference waveform data in two ways, sliding the reference waveform data and scaling the reference waveform data according to the expansion or compression of the character width of the magnetic ink character, using two sets of reference waveform data, reference waveform data for first printing method and reference waveform data for second printing method, as the reference waveform data for a plurality of printing methods; and if the same character is selected as a candidate in any three of the four selection processes that are executed first based on the reference waveform data for each character, limiting the one selection process remaining of the four selection processes to comparing and processing reference waveform data for the same character.

At least of one embodiment improves the recognition rate by executing a total of four selection processes combining two different modification processes and two sets of reference waveform data. When the same character is selected as a candidate by the first three processes, the remaining one process is executed using only the reference waveform data for the selected candidate character. The processing time can therefore be shortened compared with executing all four process combinations using the reference waveform data for all characters. If the same character is selected as a candidate in three processes, the possibility that the magnetic ink character is the selected candidate character is extremely high. The recognition rate can therefore be improved while suppressing the processing time required for the character recognition process.

Other objects and attainments together with a fuller understanding of at least of one embodiment will become apparent and appreciated by referring to the following description and claims taken in conjunction with the accompanying drawings.

DESCRIPTION OF EMBODIMENTS

Preferred embodiments of a recording media processing device, a method of controlling the recording media processing device, and non-transitory storage medium storing a program according to the present embodiments are described below with reference to the accompanying figures. A recording media processing device according to this embodiment of the embodiment is a device that recognizes a string of magnetic ink characters printed on the MICR line of a recording medium in order to verify the validity of the recording medium, which in this embodiment is a business or personal check.

Checks and Magnetic Ink Characters

A check 4 used as an example of the recording medium in this embodiment, and magnetic ink characters 101, are described first.

Figure 1A:
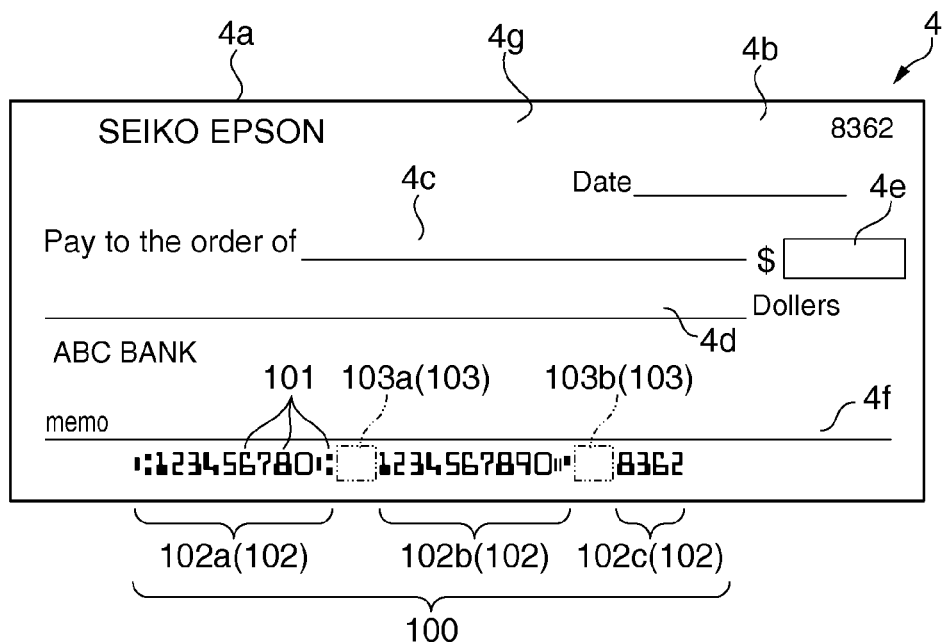
FIG. 1A shows an example of a check.
Figure 1B:
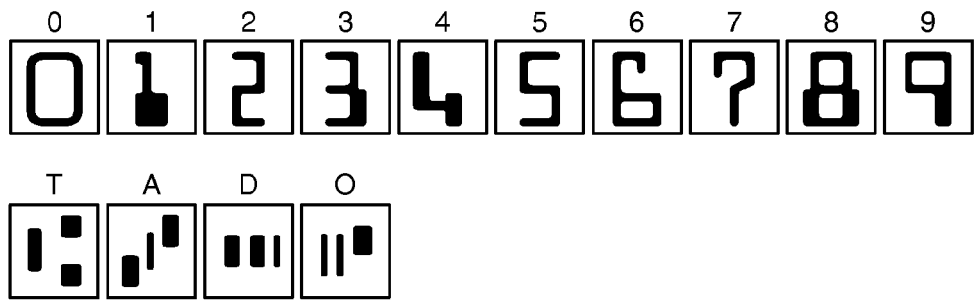
FIG. 1B shows examples of magnetic ink characters.
Figure 1C:
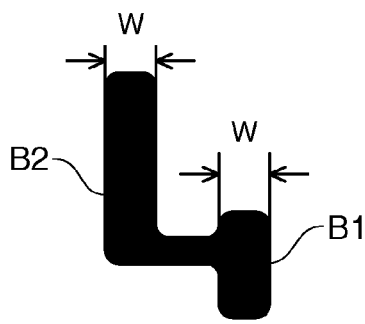
FIG. 1C shows the magnetic ink character for the number 4.

FIG. 1A shows an example of a check, and FIG. 1B shows an example of magnetic ink character in the E-13B MICR font. FIG. 1C shows the number 4 in FIG. 1B enlarged.

As shown in FIG. 1A, the check 4 has a date field 4b, payee field 4c, amount fields 4d and 4e, and a signature line 4f on the front 4g of the check form 4a. The check form 4a is a cut-sheet medium. Note that fields 4b to 4f are still empty in FIG. 1A. An MICR line 100 containing multiple magnetic ink characters 101 expressing the bank number, account number, and check number is printed along the bottom of the check form 4a. An endorsement area is provided on the back 4h of the check 4 (see FIG. 2).

The MICR line 100 includes plural fields 102 (102a, 102b, 102c) delimited by space characters 103 (103a, 103b). Each of the fields 102a, 102b, 102c is a continuous string of magnetic ink characters 101, and in this example correspond to the bank number, account number, and check number from the left end of the line.

As indicated by the imaginary lines in FIG. 1A, a space character 103a is placed between fields 102a and 102b, and another space character 103b is placed between fields 102b and 102c. These space characters 103 (103a, 103b) are recognized as space characters by the check reader 1. The space characters 103 (103a, 103b) may also occupy the width of one or multiple magnetic ink characters 101.

The magnetic ink characters 101 are characters magnetically printed on the check 4 using a specific font (such as a font in the E-13B font set), and one magnetic ink character 101 corresponds to one of plural predefined characters.

As shown in FIG. 1B, the E-13B font set consists of 14 shapes corresponding to the shapes of the magnetic ink characters 101. These 14 shapes include the 10 numbers 0 to 9, and four special symbols, a transit symbol T, an amount symbol A, a dash symbol D, and an On-Us symbol O.

The MICR line 100 may be printed on the check 4 using a first printing method or using a second printing method. The type of magnetic ink, the amount of magnetic ink deposited, and the actual shapes of the magnetic ink characters 101 printed with first printing method in the E-13B font set may differ from the magnetic ink characters 101 printed with second printing method in the E-13B font set, and the reference waveform data is therefore different.

Embodiment 1

Recording Media Processing Device

A recording media processing device according to a first embodiment is described next. A recording media processing device according to this first embodiment includes a check reader 1 and host computer 70.

Figure 2:
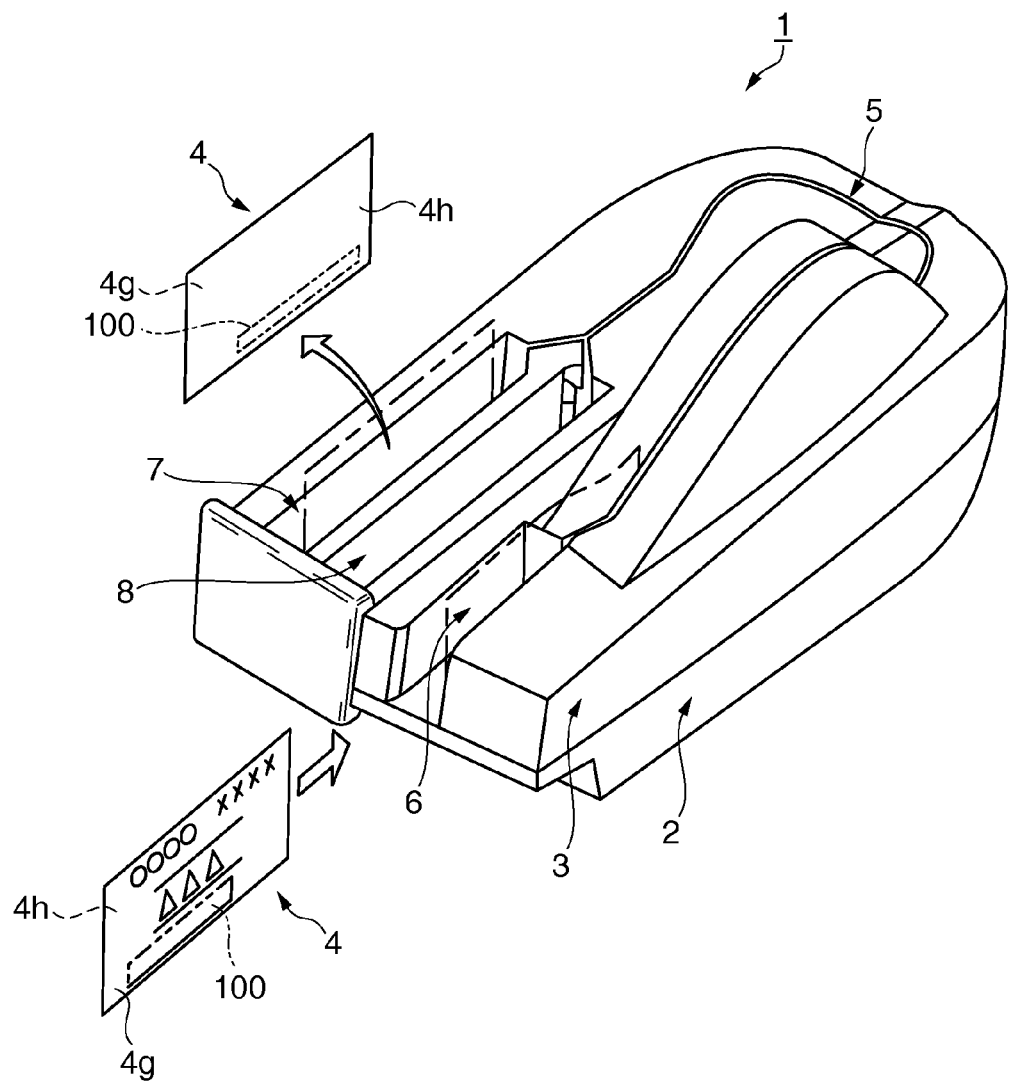
FIG. 2 is an oblique view of a check reader.

The basic configuration of a check reader 1 according to this embodiment is described first. FIG. 2 is an oblique view of the check reader 1 according to this embodiment. The check reader 1 is a device that processes checks 4, including reading magnetic ink characters recorded on a check 4, scanning both sides of the check 4, and recording a specific image in the endorsement area of the check 4.

The check reader 1 has a bottom case 2, and a cover case 3 covering the top of the bottom case 2, and other components assembled inside. A check 4 conveyance path 5 is formed inside the cover case 3 as a narrow vertical channel that is U-shaped when seen from above. One end of the conveyance path 5 communicates with a check supply unit 6 formed as a wide vertical hopper, and the other end of the conveyance path 5 splits left and right into first check discharge unit 7 and second check discharge unit 8, both of which are also wide vertical pockets.

Checks 4 are inserted to the check supply unit 6 with the top and bottom edges aligned so that the top edges (up in FIG. 1A) are up and the bottom edges (down in FIG. 1A) down, and the front and back sides matched so that the front 4g faces the outside of the U-shaped conveyance path 5 (as shown in FIG. 2). The checks 4 inserted to the check supply unit 6 are conveyed through the conveyance path 5 with the right edge shown in FIG. 1 as the leading end.

As a check 4 fed from the check supply unit 6 is conveyed through the conveyance path 5, a front image, which is an image of the front 4g, and a back image, which is an image of the back 4h, are scanned, and the MICR line 100 recorded on the front 4g is magnetically read. Checks 4 from which the MICR line 100 is successfully read are then discharged into the first check discharge unit 7 after a specific endorsement image is recorded thereon.

Checks 4 from which reading the MICR line 100 failed are then discharged into the second check discharge unit 8 without recording the specific endorsement image. A check 4 discharged into the second check discharge unit 8 may then be examined to determine why reading failed, or scanned again, for example.

Figure 3:
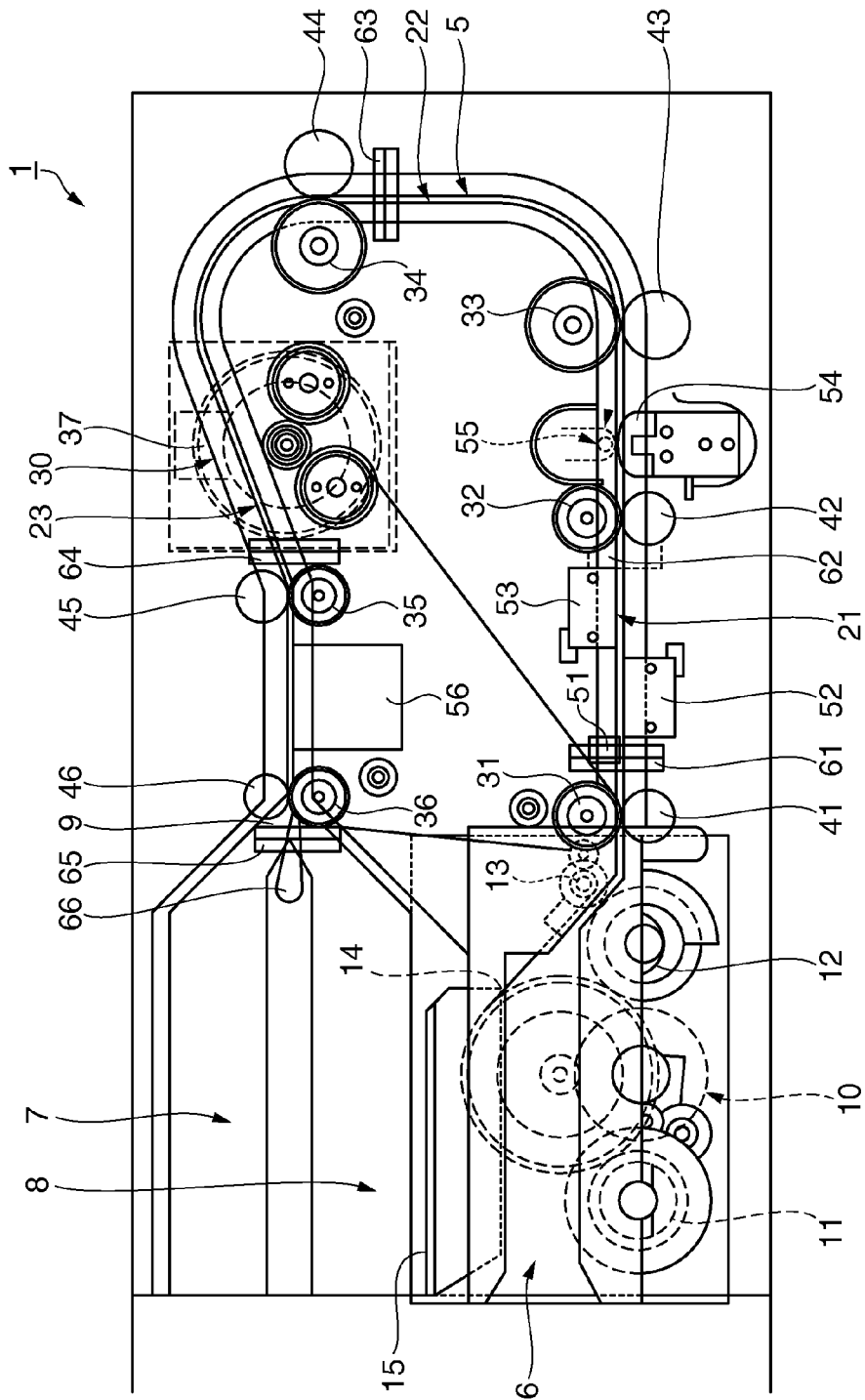
FIG. 3 shows the internal configuration of the check reader.

FIG. 3 shows the internal configuration of the check reader 1. The check supply unit 6 has a check feed mechanism 10 for feeding checks 4 (see FIG. 2) into the conveyance path 5. The check feed mechanism 10 includes a delivery roller 11, a feed roller 12, a retard roller 13 pressed against the feed roller 12, a paper feed motor 14, and a check-pressing hopper 15.

When the paper feed motor 14 drives, the checks 4 loaded in the check supply unit 6 are pressed by the check-pressing hopper 15 to the delivery roller 11 side, and the delivery roller 11 and feed roller 12 are then driven synchronously.

The check 4 is then fed between the feed roller 12 and retard roller 13 by the delivery roller 11. A specific rotational load is applied to the retard roller 13, and only the one check 4 directly contacting the feed roller 12 is separated from the other checks 4 and fed into the conveyance path 5.

The conveyance path 5 is U-shaped as described above, and has a straight upstream conveyance path portion 21 connected to the check supply unit 6, a downstream conveyance path portion 23 that curves slightly and connects to the first check discharge unit 7 and second check discharge unit 8, and a curved conveyance path portion 22 that connects the upstream conveyance path portion 21 and downstream conveyance path portion 23.

A check conveyance mechanism 30 conveys checks 4 fed into the conveyance path 5 from the check supply unit 6 through the conveyance path 5. The check conveyance mechanism 30 includes first to sixth conveyance rollers 31 to 36, first to sixth pressure rollers 41 to 46 that are pressed against and rotate in unison with the opposing conveyance rollers, and a conveyance motor 37 that rotationally drives the first to sixth conveyance rollers 31 to 36.

The first to sixth conveyance rollers 31 to 36 rotate synchronously. A stepper motor, for example, is used as the conveyance motor 37. The conveyance distance of a check 4 can therefore be known from the number of steps the stepper motor is driven.

The first to third conveyance rollers 31 to 33 are respectively disposed at the upstream end and middle of the upstream conveyance path portion 21, and at the junction to the curved conveyance path portion 22. The fourth conveyance roller 34 is disposed to the downstream end of the curved conveyance path portion 22. The fifth and sixth conveyance rollers 35, 36 are respectively disposed in the middle and downstream end of the downstream conveyance path portion 23.

A magnet 51 for magnetizing magnetic ink characters, a front contact image sensor 52, and a back contact image sensor 53 are disposed in order from the upstream end of the upstream conveyance path portion 21 between the first conveyance roller 31 and second conveyance roller 32. The MICR line 100 recorded on a check 4 is magnetized by the magnet 51.

The front contact image sensor 52 faces the front 4g of the check 4 conveyed through the conveyance path 5, and scans a front image, which is an image of the front 4g. The back contact image sensor 53 faces the back 4h of the check 4 conveyed through the conveyance path 5, and scans a back image, which is an image of the back 4h.

A magnetic head 54 is disposed between the second conveyance roller 32 and third conveyance roller 33 as a magnetic reading unit that reads the magnetic ink characters 101. The magnetic head 54 magnetically reads the MICR line 100 by detecting change in the magnetic flux density of the magnetized MICR line 100 at a specific sampling period to acquire signal waveform data as the recording medium is conveyed past the magnetic head 54.

A pressure plate 55 that presses the check 4 against the magnetic head 54 is disposed opposite the head. A recording device 56 for recording a specific endorsement image is disposed to the downstream conveyance path portion 23 between the fifth conveyance roller 35 and sixth conveyance roller 36. The recording device 56 includes a printhead, stamp, or other means capable of recording a specific image in an appropriate direction at a suitable position on the back 4h of the check 4 conveyed through the conveyance path 5.

Various sensors for controlling check conveyance are also disposed to the conveyance path 5. A paper length detector 61 for detecting the length of the conveyed check 4 is disposed at a position before the magnet 51. A multifeed detector 62 for detecting if checks 4 are multifed is disposed between the back contact image sensor 53 and the second conveyance roller 32. A jam detector 63 is disposed at a position before the fourth conveyance roller 34, and a paper jam resulting from the check 4 being stuck in the conveyance path 5 is detected when a check 4 is detected continuously for at least a specific time by the jam detector 63.

A printing detector 64 for detecting the presence of a check 4 to be endorsed by the recording device 56 is disposed at a position before the fifth conveyance roller 35. A discharge detector 65 is disposed at a position downstream from the sixth conveyance roller 36, that is, at the junction 9 where the conveyance path 5 branches to the first check discharge unit 7 and second check discharge unit 8, to detect discharged checks 4.

A flapper 66 that is operated by a drive motor 67 (see FIG. 4) is disposed to the junction 9. The flapper 66 selectively communicates the downstream end of the conveyance path 5 with the first check discharge unit 7 or second check discharge unit 8, and guides the check 4 into the selected discharge unit.

Figure 4:
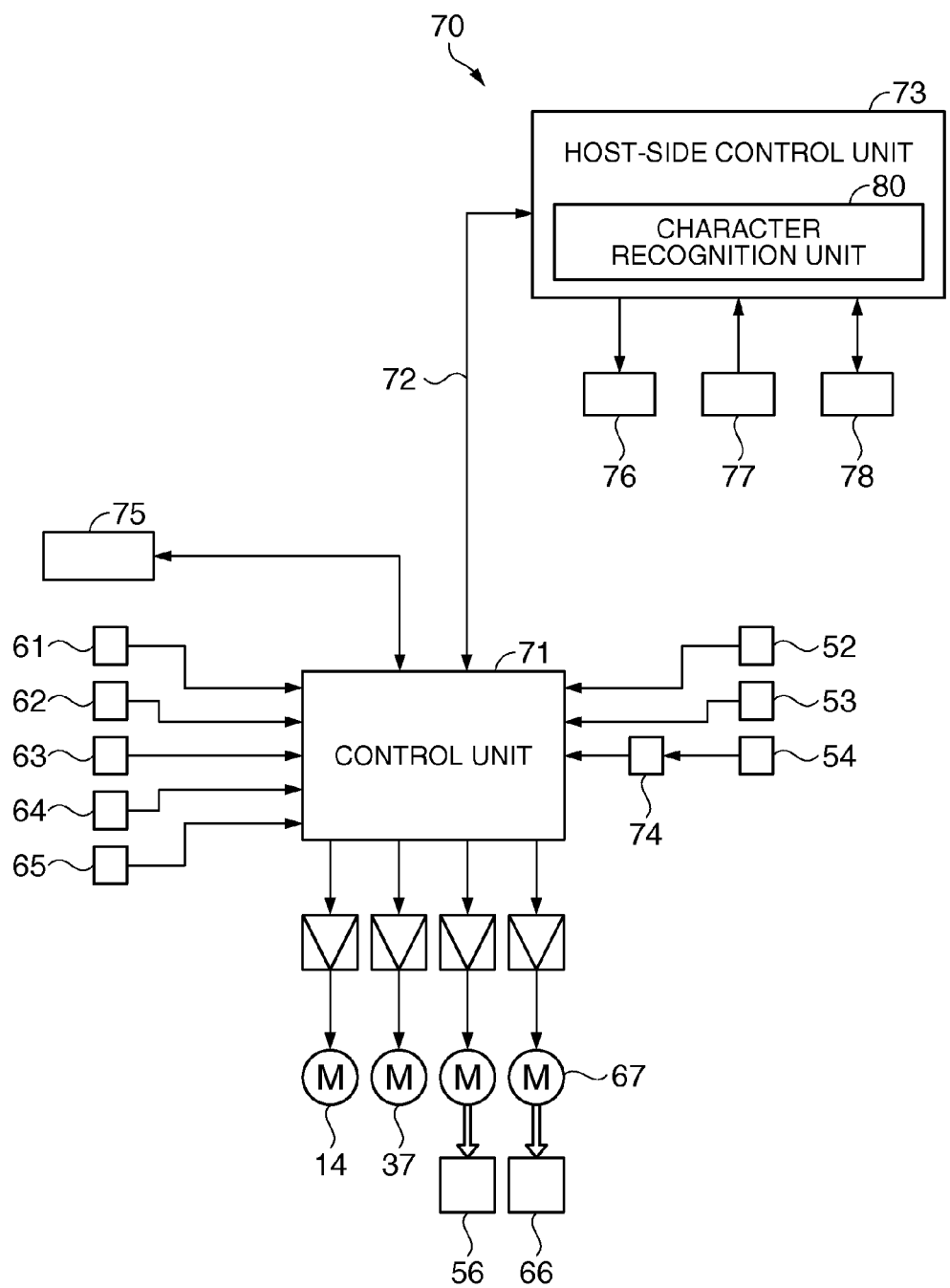
FIG. 4 is a block diagram showing the functional configuration of the check reader.

FIG. 4 is a block diagram showing the functional configuration of the check reader 1. A control unit 71 centrally controls other parts of the check reader 1 according to commands sent as controlled by the host-side control unit 73 of the host computer 70 described below, and includes a CPU, RAM, ROM, and other peripheral circuits. More specifically, the CPU reads and executes a program stored in ROM or other storage unit to control operation.

As controlled by commands sent under the control of the host-side control unit 73, the control unit 71 drives the paper feed motor 14 and conveyance motor 37 to feed the checks 4 one at a time into the conveyance path 5 (FIG. 2), and convey the supplied check 4 through the conveyance path 5. Conveyance control of a check 4 by the control unit 71 is based on detection signals from the paper length detector 61, multifeed detector 62, jam detector 63, printing detector 64, and discharge detector 65 disposed to the conveyance path 5.

As a check 4 is conveyed, the front contact image sensor 52 and back contact image sensor 53 scan front and back images of the check 4 conveyed through the conveyance path 5, and output the image data of the captured images to the control unit 71. The control unit 71 outputs this image data to the host-side control unit 73 of the host computer 70.

The magnetic head 54 detects the electromagnetic force produced by change in the magnetic field created by the passing MICR line 100 (FIG. 1A) as controlled by the control unit 71, and outputs the resulting detection signal to a signal processing circuit 74.

The signal processing circuit 74 includes an amplifier, filter for removing noise, and A/D converter, amplifies and waveshapes the detection signal input from the magnetic head 54, and outputs the result as data to the control unit 71. The control unit 71 sends data describing the detection signal input from the signal processing circuit 74 to the host-side control unit 73.

An operating unit 75 includes switches such as a power switch and operating switches disposed to the bottom case 2 (FIG. 2), detects user operation of these switches, and outputs to the control unit 71.

A host computer 70 is connected to the check reader 1 through a communication cable 72. The host computer 70 has a host-side control unit 73 including a CPU, RAM, ROM, and other peripheral circuits. More specifically, the CPU reads and executes a program stored in ROM or other storage unit to control operation. The host-side control unit 73 includes a character recognition unit 80 described below.

Connected to the host-side control unit 73 are a display 76 for displaying information, an operating unit 77 to which input devices such as a keyboard and mouse are connected, and a storage unit 78 such as an EEPROM or hard disk device capable of storing data rewritably. The storage unit 78 stores data for the front and back images of the checks 4 input from the check reader 1, and detection signal data.

In this embodiment the control unit 71 of the check reader 1 controls parts of the check reader 1 as controlled by commands sent under the control of the host-side control unit 73 of the host computer 70. More specifically, the host-side control unit 73 controls parts of the check reader 1 by the CPU of the control unit 73 running a program stored in ROM, generating control data including commands for controlling the control unit 71, and outputting the resulting control data to the control unit 71 of the check reader 1. The host computer 70 and check reader 1 in this embodiment thus cooperate to function as a recording media processing device for processing checks 4 as the recording medium.

Using a check 4 for a business transaction is described briefly next. The buyer of some product writes the date, payee, amount (in numbers and words), and signature in the fields 4b, 4c, 4d, 4e, 4f of the check form 4a (see FIG. 1A), and then presents the check 4 to the payee. The payee then recognizes the MICR line 100 with the check reader 1, and determines the validity of the check 4 by verifying the recognized data with a specific institution.

If check 4 validity is confirmed, endorsement information is recorded on the back of the check 4. The amount may then be printed on the endorsed check 4 in a MICR line 100 of magnetic ink characters 101 on the right by the payee, bank, or payment processing center. The check 4 is then processed through the settlement system of the bank, and the amount specified in the MICR line 100 is remitted to the endorsing payee. Reading the MICR line 100 and accurate character recognition are therefore required for check 4 processing.

Character Recognition Unit

The character recognition unit 80 of the host-side control unit 73 is described next. The function of the character recognition unit 80 is achieved by the cooperation of hardware and software, such as the CPU of the host-side control unit 73 running a program stored in ROM.

The character recognition unit 80 applies a character recognition process to each magnetic ink character 101 in the MICR line 100. Character recognition is a process of recognizing (identifying) each magnetic ink character 101 in the MICR line 100 that was read, or determining that the magnetic ink character 101 cannot be identified (recognized).

If all of the magnetic ink characters 101 in the MICR line 100 can be recognized, this embodiment determines that reading the MICR line 100 succeeded. Reading the MICR line 100 fails if there is even only one magnetic ink character 101 that cannot be recognized.

In this embodiment, the MICR line 100 recorded on a check 4 is read by the magnetic head 54 as the check 4 travels through the conveyance path 5 as described above. The MICR line 100 is read by the magnetic head 54 detecting change in the magnetic flux density of the MICR line 100 on the conveyed check 4 at a specific sampling period from the right end (the right in FIG. 1A) to the left end (the left in FIG. 1A).

Figure 5A:
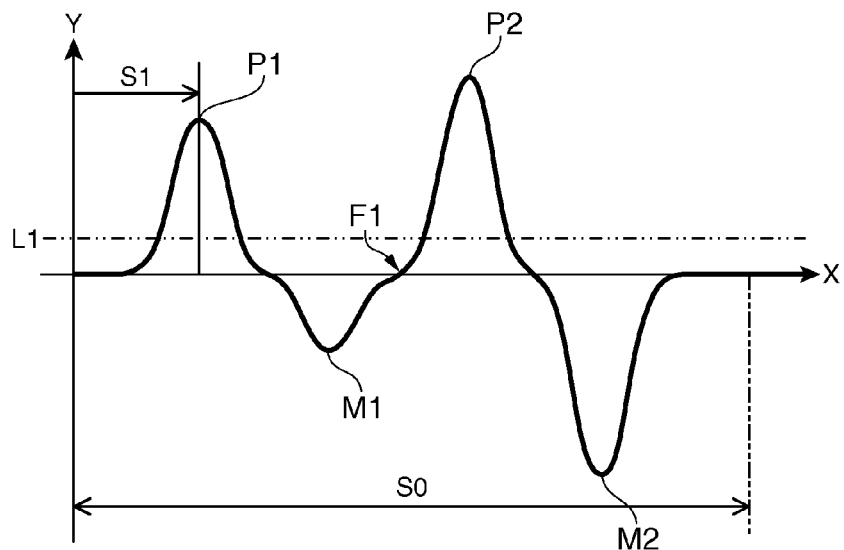
FIG. 5A shows an example of character waveform data.
Figure 5B:
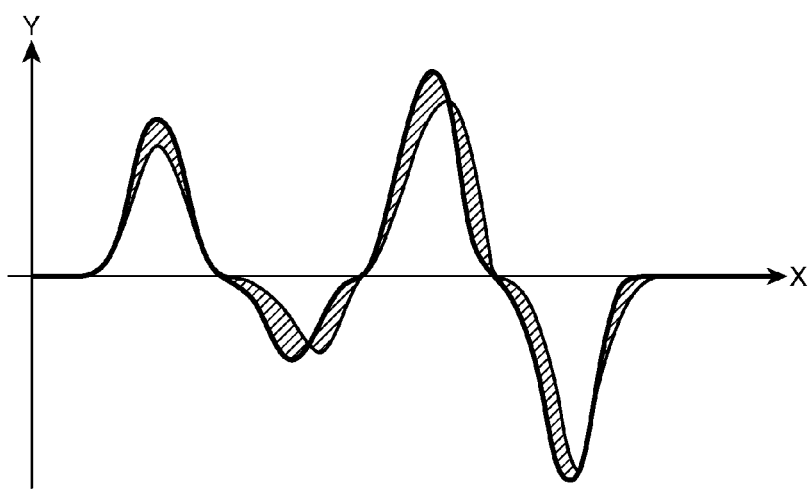
FIG. 5B shows an example of the difference between character waveform data and reference waveform data.

FIG. 5A shows an example of character waveform data. More specifically, FIG. 5A shows the character waveform data for one character in the magnetic ink character 101 set. FIG. 5B describes the difference between the character waveform data and reference waveform data. Note that FIG. 5A and FIG. 5B show character waveform data for the number 4 in FIG. 1C.

Reading with the magnetic head 54 produces a continuous waveform such as shown in FIG. 5A for one character as the signal waveform data representing one magnetic ink character in the MICR line 100. Below, the shortest interval in the sampling period is one sampling unit, and the distance of 0.013 inch is referred to as one mesh.

The character recognition unit 80 applies processes including extracting and normalizing character waveform data for one character to the acquired signal waveform data. Extracting character waveform data refers to generating character waveform data such as shown in FIG. 5A for each magnetic ink character 101 in the MICR line 100 based on the signal waveform data acquired by reading the MICR line 100.

The passage of time (sampling period) is shown on the x-axis (horizontal axis) in FIG. 5A, and the sampling units pass sequentially to the right from the origin along the x-axis. The y-axis (vertical axis) shows the relative change in magnetic flux density over time, the amplitude of the character waveform data (change on the y-axis) is divided into 256 levels, and level 128 is at the origin (0 level).

Relative change in magnetic flux density during each specific sampling period is shown in FIG. 5A from the origin to the right on the x-axis (from the right side to the left side of the number 4 shown in FIG. 1C). The value on the y-axis moves up or down according to the change in the magnetic flux density of the magnetic ink character 101, and the value on the y-axis goes positive or negative according to whether the change in the magnetic flux density is positive or negative.

As shown in FIG. 5A, the period S0 on the x-axis occupied by character waveform data for one character is defined as a specific number of sampling units, and media conveyance is controlled and the length of one sampling unit is defined accordingly. Period S0 is also defined so that the first positive peak P1 appears at specific period S1 from the position where character extraction starts in the character waveform data for one character.

The character recognition unit 80 analyzes the signal waveform data, and of the waveform peaks that exceed a specific level L1, detects the first positive peak that appears in the direction of the end of the waveform (to the right on the x-axis) as the first positive peak P1.

A peak is a high or low point in the signal waveform data, and these peaks appear at a specific period along the x-axis. Peaks on the positive side (P1 and P2 in FIG. 5A) are called positive peaks, and peaks on the negative side (M1 and M2 in FIG. 5A) are called negative peaks. The value on the x-axis corresponding to each peak is called the position (level) of the peak. The character waveform data of each of the 14 magnetic ink characters 101 has plural positive peaks and negative peaks.

For each magnetic ink character 101 in the MICR line 100, the character recognition unit 80 determines the start character extraction position so that the position of the detected first positive peak P1 is at the position length S1 from the origin on the x-axis of the extracted waveform. The character recognition unit 80 then extracts the character waveform data in the range S0 occupied by the waveform for one character from this start character extraction position. The magnetic ink character 101 corresponding to the character waveform data extracted for one character is referred to below as the target character. Note that "distance" as used herein is the length on the x-axis of the waveform data as shown in FIG. 5A, and can be substituted by time, for example.

The character recognition unit 80 then normalizes the extracted character waveform data so that the amplitude levels on the y-axis coincide with the reference waveform data for pattern matching shown by the bold line in FIG. 5B. The reference waveform data is template data for the ideal waveform resulting from the magnetic head 54 reading a magnetic ink character 101 corresponding to one of the fourteen MICR characters in the E-13B font set shown in FIG. 1B. Reference waveform data for these 14 characters is stored in a storage unit such as ROM accessible to the host-side control unit 73 of the host computer 70.

The character recognition unit 80 then applies character recognition to each of the magnetic ink characters 101 in the MICR line 100 from the extracted character waveform data based on specific recognition conditions. Character recognition of the magnetic ink characters 101 either identifies the magnetic ink character 101 that was read or determines that the character cannot be recognized. Character recognition is further described below.

The character recognition unit 80 compares the normalized character waveform data indicated by the thin line in FIG. 5B with reference waveform data stored for each character in ROM, and detects the difference therebetween. This difference is the size of the shaded area in FIG. 5B, and more specifically is the sum of the absolute values of the y-axis value of the waveform described by the character waveform data (signal level), and the y-axis value of the waveform described by the reference waveform data.

The smaller the difference between the character waveform data for one character and the reference waveform data for the same character, the closer the resemblance between the waveform represented by the character waveform data and the waveform represented by the reference waveform data, and the greater the probability that the magnetic ink character 101 described by the character waveform data is the character described by the reference waveform data.

After calculating the difference between the character waveform data for the one character and the reference waveform data of all 14 MICR characters in the E-13B font set shown in FIG. 1B, the character recognition unit 80 selects the character corresponding to the reference waveform data with the smallest difference as a first candidate, and the character corresponding to the reference waveform data with the next-smallest difference as a second candidate. The character recognition unit 80 then compares the difference between the character waveform data and the reference waveform data for the characters selected as the first candidate and second candidate with a specific threshold.

The threshold is stored in ROM or other memory of the host-side control unit 73 of the host computer 70.

If the result of comparing the difference with the threshold level shows that the difference between the character waveform data and the reference waveform data of the first candidate is less than or equal to the threshold, and the difference between the character waveform data and the reference waveform data of the second candidate is greater than the threshold, the character recognition unit 80 determines that the magnetic ink character 101 was recognized, and confirms the character selected as the first candidate as the recognized character resulting from character recognition.

The threshold used for magnetic recognition is set appropriately so that only the difference between the character waveform data and the reference waveform data for the correct character is less than or equal to the specific threshold, and the difference between the character waveform data and the reference waveform data for the other characters exceeds the threshold. As a result, if the difference with the first candidate exceeds the threshold, or there are plural characters resulting in a difference less than or equal to the threshold, an error such as a read error with the magnetic head 54 or a check 4 conveyance error may have occurred resulting in a recognition error, and recognition is determined not possible.

Characters are recognized using a simple comparison and a sliding comparison in the first recognition phase and third recognition phase of the character recognition process described below. A simple comparison means simply comparing the waveform of the character waveform data for the target character with the waveform of the reference waveform data. A sliding comparison means sliding the waveform of the character waveform data for the target character and the waveform of the reference waveform data a specific distance (number of sampling units) in a specific range for comparison.

Stretching or compression of the waveform on the x-axis may occur in the acquired character waveform data due to variation in the character width of the magnetic ink characters 101 printed on the check 4, or deviation in the pitch while conveying the check 4 through the check reader 1, for example. When this happens, the difference between the reference waveform data and character waveform data may increase even though the reference waveform data is for the character corresponding to the target character when the difference between the character waveform data of the target character and the reference waveform data is calculated by a simple comparison or sliding comparison. The target character is then determined unrecognizable by magnetic character recognition, and the recognition rate drops.

This embodiment therefore reduces the effect of stretching or compression of the character data waveform on recognition by scaling and adjusting the waveform of the reference waveform data for the character compared with the target character, and calculating the difference between the character waveform data of the target character and the adjusted reference waveform data, in the second recognition phase and fourth recognition phase of the character recognition process described below. The scaling process performed in the second recognition phase and fourth recognition phase adjusts the character width of the magnetic ink character 101, and is referred to herein as a "character width scaling process."

Using the waveform of the number 4 shown in FIG. 5A for example, the character width scaling process applied to the waveform of the reference waveform data sets a scaling point F1 as a reference point, and slides the waveform on the right side (right on the x-axis) of the scaling point F1 a specific distance (number of sampling units) in a specific range.

Note that if the scaling point F1 is set to a position where the change is great, the difference to the character waveform data may be increased by sliding only part of the waveform of the reference waveform data. The scaling point F1 is therefore preferably set to a point where the change is small. The specific range and the specific distance that the waveform is slid are set according to the shape of the waveform of the reference waveform data for each character.

As described above, the shapes of the printed magnetic ink characters 101, the type of magnetic ink, and the amount of magnetic ink deposited when printing can vary according to the printing method. Reference waveform data for plural different printing methods is therefore stored in ROM. The following example therefore describes operation using two different data sets, reference waveform data for printing method 1 (first printing method) and reference waveform data for printing method 2 (second printing method).

To improve the recognition rate in magnetic ink character recognition, the waveform adjustment and comparison processes described above are preferably applied to all 14 characters shown in FIG. 1B in each of the two reference waveform data sets. However, because this increases the amount of data to be processed in the comparison processes, a long processing time is required for magnetic ink character recognition if all of the multiple combinations of comparison processes reference the reference waveform data for all possible characters. The disclosure provides a processing method that improves the recognition rate in magnetic ink character recognition while suppressing the total process time.

Character Recognition Process

Figure 6:
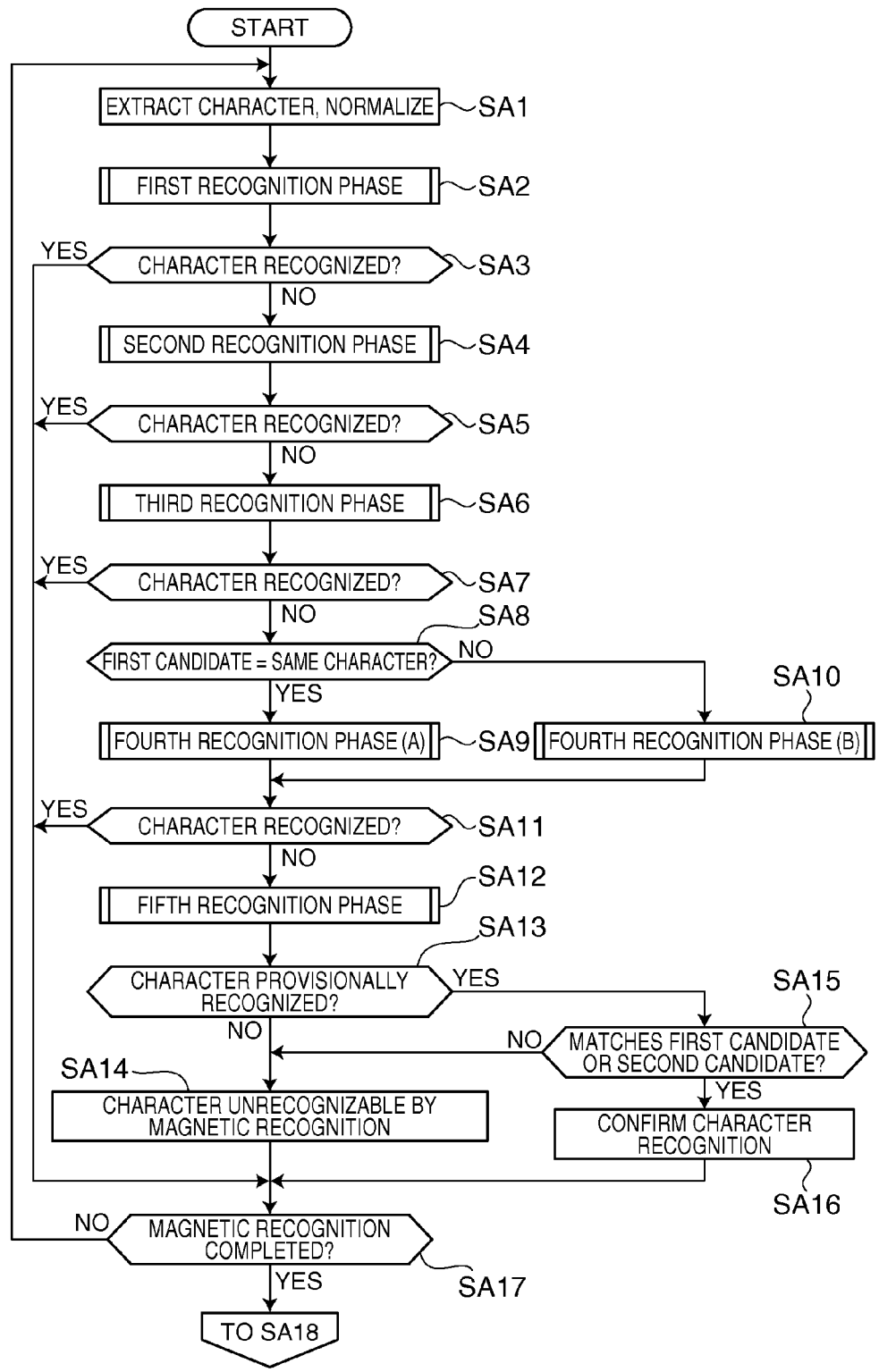
FIG. 6 is a flow chart describing the character recognition process in a check reader according to a first embodiment.
Figure 7:
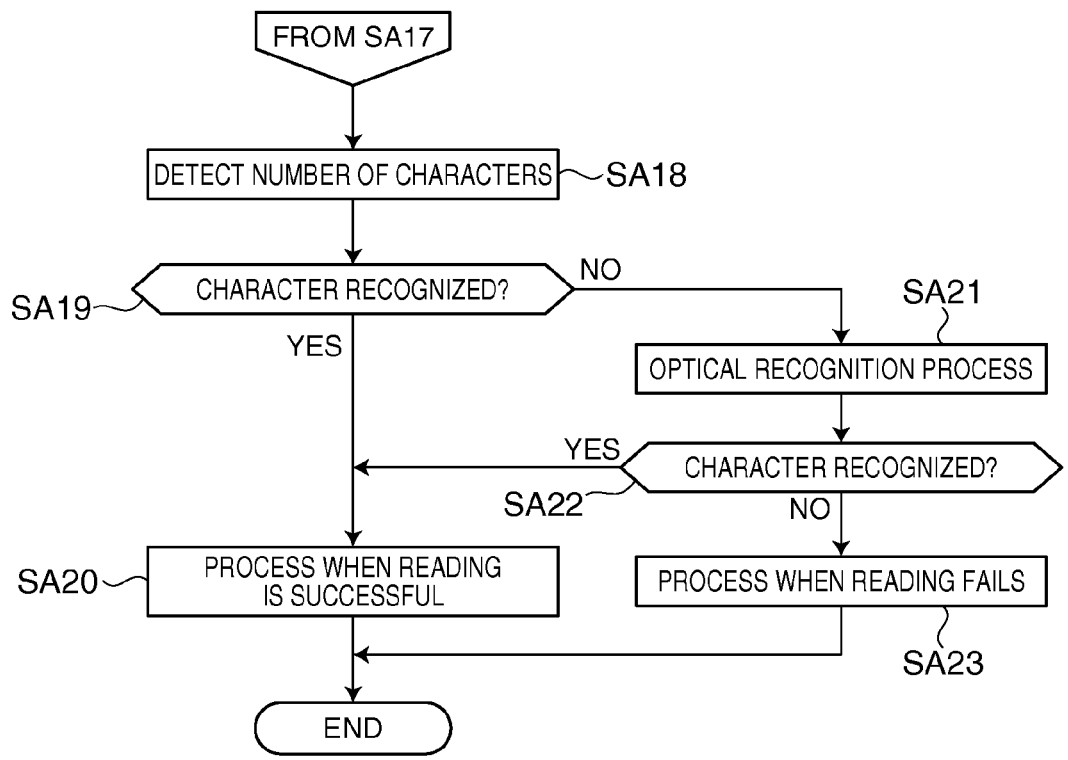
FIG. 7 is a flow chart describing the character recognition process in a check reader according to a first embodiment.

The character recognition process in the check reader 1 according to the first embodiment is described next. FIG. 6 and FIG. 7 are flow charts describing the character recognition process in a check reader according to the first embodiment.

The MICR line 100 recorded on the check 4 is read by the magnetic head 54 before step SA1 in FIG. 6. Signal waveform data generated by the signal processing circuit 74 amplifying, filtering, and wave-shaping the read signal is then output by the control unit 71 to the host-side control unit 73. The front contact image sensor 52 also images the front of the check 4, and the image data is output from the control unit 71 to the host-side control unit 73.

Then in step SA1, the first positive peak P1 (FIG. 5A) used as the reference for the start character extraction position is detected in the acquired signal waveform data. Based on the position of the detected first positive peak P1, the character recognition unit 80 extracts character waveform data for one character corresponding to a magnetic ink character 101 from the signal waveform data, and applies a normalization process to the extracted character waveform data.

The magnetic recognition process described from step SA2 below has five recognition phases from a first recognition phase in step SA2 to a fifth recognition phase in step SA12. These five recognition phases apply magnetic recognition to the character waveform data of the target character using different methods.

These five recognition phases are sequentially applied to the character waveform data of the target character extracted in step SA1. If the target character is successfully recognized in any of the first to fourth of the five recognition phases, the next magnetic ink character 101 is made the target character and magnetic recognition is applied to the character waveform data for the new target character without proceeding to the next phase. Target characters that cannot be recognized in these five recognition phases are recognized by an optical recognition process in step SA21 described below (FIG. 7).

This embodiment uses the reference waveform data for printing method 1 in the first recognition phase and second recognition phase, and uses the reference waveform data for printing method 2 in the third recognition phase and fourth recognition phase. Character recognition is thus processed in four different ways. Of these four processes (phases), the content of the fourth recognition phase depends upon the results from the first recognition phase (step SA2) to the third recognition phase (step SA6). The fifth recognition phase and optical recognition process are processes that complement the four processes executed in the first recognition phase to the fourth recognition phase.

In the first recognition phase in step SA2, the character recognition unit 80 detects the difference between the character waveform data for the target character and the reference waveform data for printing method 1 for the 14 MICR characters shown in FIG. 1B by means of a simple comparison and a sliding comparison. As described above, if the difference between the character waveform data and the reference waveform data of the first candidate character is less than or equal to a specific threshold, and the difference between the character waveform data and the reference waveform data of the second candidate character is greater than the threshold, recognition of the target character is confirmed. If the target character is recognized as a result of this simple comparison, the first recognition phase ends without executing the sliding comparison.

In step SA3, the character recognition unit 80 determines if the target character was successfully recognized in the first recognition phase in step SA2. If the target character was recognized (step SA3 returns YES), the character recognition unit 80 knows that the target character was recognized, skips step SA4, and goes directly to step SA17. However, if the target character was not recognized (step SA3 returns NO), control goes to step SA4.

The character recognition unit 80 executes the character width scaling process in the second recognition phase in step SA4. More specifically, the character recognition unit 80 scales the waveform of the reference waveform data of the character being compared referenced to scaling point F1, and then calculates the difference between the character waveform data of the target character and the scaled reference waveform data to recognize the character.

In step SA5, the character recognition unit 80 determines if the target character was successfully recognized in the second recognition phase in step SA4. If the target character was recognized (step SA5 returns YES), the character recognition unit 80 skips the third recognition phase and goes directly to step SA17. However, if the target character was not recognized (step SA5 returns NO), control goes to the third recognition phase in step SA6.

The third recognition phase in step SA6 uses the reference waveform data for printing method 2 to perform the same process as the first recognition phase in step SA2, and further description thereof is thus omitted.

In step SA7, the character recognition unit 80 determines if the target character was successfully recognized in the third recognition phase in step SA6. If the target character was recognized (step SA7 returns YES), the character recognition unit 80 skips the fourth recognition phase and goes directly to step SA17. However, if the target character was not recognized (step SA7 returns NO), control goes to step SA8.

In step SA8, the character recognition unit 80 determines if the character used as the first candidate is the same character in the first to third recognition phases. If the first candidate character was the same (step SA8 returns YES), the character recognition unit 80 goes to fourth recognition phase (A) in step SA9. If the first candidate character is not the same (step SA8 returns NO), the character recognition unit 80 goes to fourth recognition phase (B) in step SA10.

Reference waveform data for printing method 2 is used, and the same character width scaling process as in the second recognition phase in step SA4 is applied, in the fourth recognition phase (A) in step SA9 and the fourth recognition phase (B) in step SA10, but the fourth recognition phase (A) limits the characters of the reference waveform data that are compared with the character waveform data of the target character.

Instead of comparing and calculating the difference with the reference waveform data for all 14 characters of the E-13B font set shown in FIG. 1B, the fourth recognition phase (A) in step SA9 only compares the character waveform data of the target character with the reference waveform data of the character used as the first candidate in the first to third recognition phases to calculate the difference therebetween.

If the same character is selected as the first candidate as a result of recognition in the first recognition phase to third recognition phase, the possibility that the target character is the first candidate is extremely high. The processing time can therefore be shortened in the fourth recognition phase (A) by limiting the reference waveform data that is compared with the character waveform data only to the first candidate. The character used as the second candidate in the fourth recognition phase (A) is preferably the second candidate with the smallest calculated difference in the first to third recognition phases.

In the fourth recognition phase (B) in step SA10, however, the character waveform data of the target character is compared with the reference waveform data for the 14 characters shown in FIG. 1B to calculate the difference therebetween in the same way as in the first to third recognition phases.

In step SA11, the character recognition unit 80 determines if the target character was successfully recognized in the fourth recognition phase (A) in step SA9 or the fourth recognition phase (B) in step SA10. If the target character was recognized (step SA11 returns YES), the character recognition unit 80 skips the fifth recognition phase and goes directly to step SA17. However, if the target character was not recognized (step SA11 returns NO), control goes to the fifth recognition phase in step SA12.

The fifth recognition phase in step SA12 removes the effect of waveform distortion of the character waveform data for the target character to recognize the target character.

The fifth recognition phase does not confirm recognition of the target character as in the other recognition phases, and recognition of the target character is confirmed only if a specific condition is met as described below. Confirmation of target character recognition in the fifth recognition phase is therefore referred to as "provisional confirmation" below. This is because the fifth recognition phase recognizes magnetic ink characters using a comparison value obtained by comparing a specific part of the waveform of the character waveform data and the waveform of the reference waveform data.

In the next step SA13, the character recognition unit 80 determines if the target character was provisionally recognized in the fifth recognition phase. If recognition of the target character was not provisionally confirmed (step SA13 returns NO), that is, if the target character could not be recognized in any of the first to fifth recognition phases, the character recognition unit 80 determines that the target character cannot be recognized by magnetic recognition (step SA14), and goes to step SA17.

If recognition of the target character is provisionally confirmed in the fifth recognition phase (step SA13 returns YES), the character recognition unit 80 determines if there is a match between the character provisionally recognized in the fifth recognition phase and the character used as the first or second candidate character in the preceding recognition phases (step SA15). For the first and second recognition candidates used here, the character with the smallest calculated difference in the first to fourth recognition phases is used as the first candidate, and the character with the next-smallest calculated difference is used as the second candidate.

If the characters do not match (step SA15 returns NO), the character recognition unit 80 determines that the target character cannot be recognized by magnetic recognition (step SA14), and goes to step SA17. If there is a match (step SA15 returns YES), the character recognition unit 80 confirms that the target character is the character that was provisionally recognized in the fifth recognition phase (step SA16), and goes to step SA17.

In step SA17, the character recognition unit 80 determines if the magnetic recognition process was completed, that is, if all magnetic ink characters 101 in the MICR line 100 were processed as the target character. If the magnetic recognition process was completed (step SA17 returns YES), the character recognition unit 80 goes to step SA18 in FIG. 7. If the magnetic recognition process is not completed (step SA17 returns NO), the character recognition unit 80 returns to step SA1 and magnetically recognizes the next target character.

In step SA18 in FIG. 7, the character recognition unit 80 detects the number of characters in the recognition string. In step SA19, the character recognition unit 80 determines if all characters contained in the recognition string, that is, all magnetic ink characters 101 in the MICR line 100, were recognized.

If all characters were recognized (step SA19 returns YES), the host-side control unit 73 determines that reading the MICR line 100 was successful and in step SA20 executes the process that is performed when the MICR line 100 is successfully read. The process performed when the MICR line 100 is successfully read includes, for example, storing the information indicated by the MICR line 100 in RAM or other storage unit, recording a specific endorsement image on the back of the check 4 with a printer or other recording device, and discharging the check 4 from the check reader 1.

However, if there is even only one character in the recognition string that could not be recognized (step SA19 returns NO), the character recognition unit 80 executes the optical recognition process in step SA21 to optically recognize target characters not recognized by magnetic recognition.

In the optical recognition process of step SA21, the character recognition unit 80 identifies the range of data corresponding to an image of the MICR line 100 in the data for the image of the check 4 front captured by the front contact image sensor 52, and extracts image data for each magnetic ink character 101. The character recognition unit 80 then optically recognizes the characters by comparing bitmap patterns for each of the 14 MICR characters with the extracted image data, and recognizes each of the magnetic ink characters 101.

The optical recognition process in step SA21 provisionally confirms the character based on the result of optical recognition, and confirms the recognized character if this provisionally recognized character matches a character used as a recognition candidate (first candidate, second candidate) in step SA15.

In step SA22, the character recognition unit 80 determines if all magnetic ink characters 101 that were not recognized by magnetic recognition were recognized by the optical recognition process in step SA21. If all magnetic ink characters 101 were recognized (step SA22 returns YES), the character recognition unit 80 executes in step SA20 the operation performed when the MICR line 100 is successfully read.

However, if there is even only one magnetic ink character that could not be recognized (step SA22 returns NO), the host-side control unit 73 executes in step SA23 the operation performed when reading the MICR line 100 fails. The operation performed in step SA25 when reading the MICR line 100 fails discharges the check 4 without printing an endorsement image, for example. The discharged check 4 is then examined to determine why reading failed, or is processed again, for example.

The character recognition process of the check reader 1 according to this first embodiment ends as described above.

The effect of a recording media processing device, control method of a recording media processing device, and non-transitory storage medium storing a program according to at least of one embodiment as described above is described below.

(1) The recognition rate can be improved in the first to fourth recognition phases because the recognition process uses plural combinations of recognition processing and reference waveform data, such as two processing methods and two sets of reference waveform data. Furthermore, if the same character is selected as the first candidate in the first three processes executed in the first to third recognition phases, the recognition process in the fourth recognition phase is limited to using the reference waveform data for that first candidate character instead of using the reference waveform data for all characters in the E-13B font set shown in FIG. 1B, and the total processing time can therefore be shortened when compared with applying all four processes of the first to fourth recognition phases using the reference waveform data for all possible characters. If the same character is selected as a candidate in three processes, the possibility is extremely high that the magnetic ink character 101 is the candidate character. The processing time required for the character recognition process can therefore be suppressed while improving the recognition rate.

(2) Even when the magnetic ink character 101 is not recognized by the character recognition processes of the first recognition phase to fourth recognition phase that are performed first, there is a strong possibility that the character selected as the recognition candidate is the target magnetic ink character 101 because the difference is smallest difference calculated in all of the character recognition processes. The fifth recognition phase that uses a different recognition method, and optical recognition, are then executed as complementary processes, and if the character selected as the candidate is the same as the character used as a recognition candidate (first candidate, second candidate), the candidate character is recognized as the magnetic ink character, and the recognition rate can be further improved.

Embodiment 2

A recording media processing device, a method of controlling a recording media processing device, and a non-transitory storage medium storing a program according to a second embodiment are described next. The recording media processing device according to the second embodiment includes a check reader 1 and host computer 70 as in the first embodiment, but adds to the character recognition process executed by the character recognition unit 80 in the first embodiment. Further description of content that is the same as in the first embodiment is therefore omitted, and the content that is added in this embodiment to the character recognition process of the first embodiment is described below.

Character Recognition Process

Figure 8:
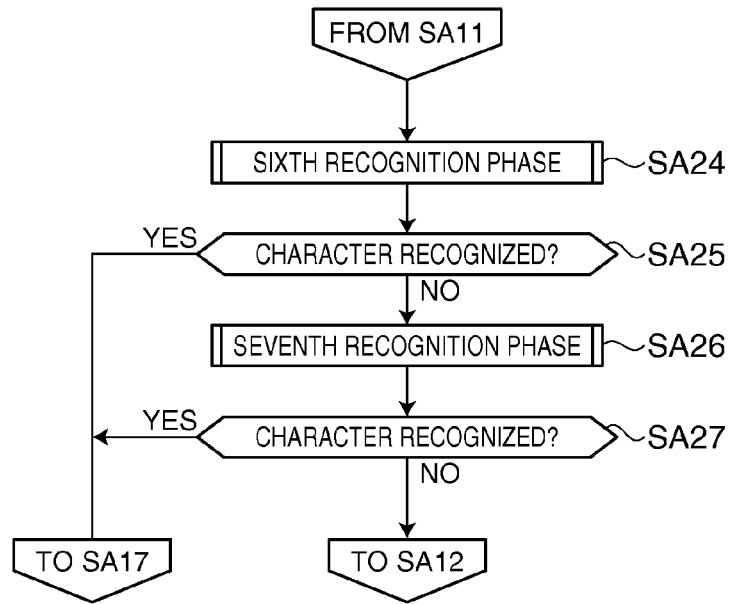
FIG. 8 is a flow chart describing the character recognition process in a check reader according to a second embodiment.

The character recognition process of the second embodiment is described with reference to FIG. 8. FIG. 8 is a flow chart of steps in the character recognition process executed by a check reader according to the second embodiment. More specifically, FIG. 8 is a flow chart of the content that is added to the character recognition process of the first embodiment.

As shown in FIG. 8, the character recognition process of the second embodiment has steps SA24 to SA27 including a sixth recognition phase and a seventh recognition phase added between step SA11 and step SA12 in the character recognition process of the first embodiment.

The character recognition process of the first embodiment executes a character width scaling process that increases or decreases the character width of the magnetic ink character 101 in the second recognition phase and fourth recognition phase in order to improve the recognition rate of magnetic ink character recognition. However, the line width of the magnetic ink characters 101 printed on checks 4 sold through normal distribution channels can vary due to variations in printing the magnetic ink characters 101.

A "line" as used here is a vertical line segment that is part of a character in the E-13B font set. For example, the number 4 shown enlarged in FIG. 1C has a first vertical line B1 and a second vertical line B2. The first vertical line B1 and second vertical line B2 have the same width W. A line (width) being thick or thin indicates whether the line width W of first vertical line B1 and second vertical line B2 in this example is thick or thin.

In the waveform of the number 4 shown in FIG. 5A, the distance from the first positive peak P1 to the first negative peak M1 corresponds to the first vertical line B1, and the distance from the second positive peak P2 to the second negative peak M2 corresponds to second vertical line B2. If the line width W of first vertical line B1 and second vertical line B2 shown in FIG. 1C is thick or thin, the distance between the positive peak (P1, P2) and negative peak (M1, M2) in the waveform shown in FIG. 5A will increase or decrease. If the line width thus varies, the possibility of successful recognition is low even if the character width scaling process is applied.

The character recognition process of the second embodiment adds a sixth recognition phase and a seventh recognition phase, and applies a line width scaling process based on the deviation of the line width W of the magnetic ink character 101 in order to further improve the recognition rate of magnetic ink character recognition. This line width scaling process scales and corrects the waveform of the reference waveform data of the compared character by inserting or deleting data between the positive peak (P1, P2) and negative peak (M1, M2).

Because adding this line width scaling process in the sixth recognition phase and seventh recognition phase increases the processing time of the character recognition process, processing time is also suppressed in these recognition phases.

The character recognition process of the second embodiment first executes the character recognition process of the first embodiment through step SA11. Control then goes from step SA11 to the sixth recognition phase in step SA24 as shown in FIG. 8.

In the sixth recognition phase in step SA24, the character recognition unit 80 executes the character width scaling process using the reference waveform data for printing method 1 for the 14 characters in the E-13B font set shown in FIG. 1B, and calculates the difference to the character waveform data. The character recognition unit 80 selects the character with the smallest difference as a first candidate and the character with the next-smallest difference as a second candidate, compares the differences with a specific threshold, and if the difference of the first candidate character is less than or equal to the threshold and the difference of the second candidate is greater than the threshold, determines that the target character was recognized.

In step SA25, the character recognition unit 80 determines if the target character was successfully recognized in the sixth recognition phase in step SA24. If the target character was recognized (step SA25 returns YES), the character recognition unit 80 skips step SA26 and goes directly to step SA17. However, if the target character was not recognized (step SA25 returns NO), control goes to step SA26.

In the seventh recognition phase in step SA26, the character recognition unit 80 executes the character width scaling process using the reference waveform data for printing method 2, and calculates the difference to the character waveform data. In the seventh recognition phase the character waveform data of the target character is compared only with the reference waveform data of the first candidate and second candidate used in the sixth recognition phase to calculate the differences instead of using the reference waveform data for all 14 characters shown in FIG. 1B.

In step SA27, the character recognition unit 80 determines if the target character was successfully recognized in the seventh recognition phase in step SA26. If the target character was recognized (step SA27 returns YES), the character recognition unit 80 knows that the character was recognized and goes directly to step SA17. However, if the target character was not recognized (step SA27 returns NO), control goes to step SA12 in FIG. 6. Operation from step SA12 is the same as described in the first embodiment described above.

The effect of the recording media processing device, method of controlling a recording media processing device, and a program according to the second embodiment is described below.

At least of one embodiment can further improve the recognition rate by executing the two processes of the sixth recognition phase and seventh recognition phase in addition to the four processes of the first recognition phase to the fourth recognition phase. In addition, because the character waveform data is processed and compared in the seventh recognition phase using only the reference waveform data for the characters selected as the first candidate and second candidate in the preceding sixth recognition phase, instead of using the reference waveform data for all characters in the E-13B font set shown in FIG. 1B, the processing time can be shortened compared with processing the reference waveform data for all characters in both of these two additional processes. The processing time required for the character recognition process can therefore be suppressed while improving the recognition rate.

A preferred embodiment is described above, but the invention is not limited thereto and can obviously be modified and adapted as desired within the scope of at least of one embodiment.

For example, the recognition process in the first recognition phase and second recognition phase compares reference waveform data for printing method 1, and the recognition process in the third recognition phase and fourth recognition phases (A) and (B) compares reference waveform data for printing method 2, but the invention is not so limited. An embodiment that executes the recognition process in the first recognition phase and second recognition phase by comparing reference waveform data for printing method 2, and executes the recognition process in the third recognition phase and fourth recognition phases (A) and (B) by comparing reference waveform data for printing method 1, is also conceivable.

In addition, the recognition process in the sixth recognition phase in the second embodiment compares reference waveform data for printing method 1, and the recognition process in the seventh recognition phase compares reference waveform data for printing method 2, but the invention is not so limited. An embodiment that executes the recognition process in the sixth recognition phase by comparing reference waveform data for printing method 2, and executes the recognition process in the seventh recognition phase by comparing reference waveform data for printing method 1, is also conceivable.

The foregoing embodiments describe also executing an optical recognition process, but the invention is not so limited. An embodiment that does not execute the optical recognition process when the desired recognition rate is achieved in the magnetic recognition phase is also conceivable.

Magnetic ink characters 101 can be printed on a check 4 by methods including inkjet printing, thermal transfer printing, laser printing, offset printing. Reference waveform data for at least two printing methods is stored in ROM or other storage unit of the host-side control unit 73 of the host computer 70, but can be stored in ROM or other storage unit of the control unit 71 in the check reader 1. Printing method 1 may be offset printing, and printing method 2 may be laser printing, in the foregoing embodiments.

The functions of parts of the check reader 1 and the control method of the check reader 1 described in the foregoing embodiment can also be achieved by storing all or part of the foregoing program on a floppy disk, hard disk, optical disc, magneto-optical disc, Compact Disc, flash ROM, or other storage medium, and installing the program on a personal computer, for example.

An embodiment that stores all or part of a program for executing the foregoing control method can also be stored in ROM or other memory of the check reader 1 control unit 71, and the CPU of the control unit 71 can read and run the program. In this embodiment, the reference waveform data for the 14 characters shown in FIG. 1B may be stored in ROM or other memory of the check reader 1 control unit 71. Threshold values for comparing the difference with the reference waveform data can also be stored in ROM or other memory of the check reader 1 control unit 71. As a result, the control unit 71 of the check reader 1 can execute the processes of the character recognition unit 80 described above.

The embodiment being thus described, it will be obvious that it may be varied in many ways. Such variations are not to be regarded as a departure from the spirit and scope of at least of one embodiment, and all such modifications as would be obvious to one skilled in the art are intended to be included within the scope of the following claims.

What is claimed is:

1. A recording media processing device comprising:
a magnetic reading unit that magnetically reads a magnetic ink character recorded on a recording medium;
a storage unit that stores reference waveform data for a plurality of characters and a specific threshold value; and
a character recognition unit that compares character waveform data acquired by the magnetic reading unit reading the magnetic ink character with the reference waveform data read from the storage unit and calculates a difference therebetween, selects a candidate character for the read magnetic ink character based on the difference, and determines whether or not the candidate character is the magnetic ink character based on the difference and the specific threshold;
wherein when selecting the candidate character, the character recognition unit modifies reference waveform data for a plurality of printing methods in plural ways and compares the character waveform data with plural combinations of modified reference waveform data to select the candidate, and
when a character selected as a candidate in at least two combinations is the same character, limits comparison in at least one remaining combination to the reference waveform data for the same character.

2. The recording media processing device described in claim 1, wherein:
when the candidate is determined to not be the magnetic ink character based on the difference and the specific threshold, the character recognition unit selects the character of the reference waveform data with the smallest difference as a recognition character candidate,
executes an additional process of comparing a specific part of the character waveform data and a specific part of the reference waveform data and selecting a candidate for the magnetic ink character, and
when the character selected as the candidate in the additional process matches the character selected as the recognition character candidate, determines that the character selected as the recognition character candidate is the magnetic ink character.

3. The recording media processing device described in claim 1, wherein:
the character recognition unit modifies the reference waveform data in two ways, sliding the reference waveform data and scaling the reference waveform data according to the expansion or compression of the character width of the magnetic ink character,
uses two sets of reference waveform data, reference waveform data for first printing method and reference waveform data for second printing method, as the reference waveform data for a plurality of printing methods, and
sequentially executes a total of four selection processes, and
if the same character is selected as a candidate in any three of the four selection processes that are executed first based on the reference waveform data for each character, limits the one selection process remaining of the four selection processes to comparing and processing reference waveform data for the same character.

4. The recording media processing device described in claim 3, wherein:
in addition to the foregoing four process combinations, the character recognition unit scales the line width of the reference waveform data according to expansion or compression of the line width of the magnetic ink character, and
sequentially executes two additional selection processes using two sets of reference waveform data, the reference waveform data for first printing method and the reference waveform data for second printing method, and
after executing one of the two additional selection processes using the reference waveform data for each character, limits the other of the two additional selection processes to the reference waveform data for the character selected as a candidate in the one additional selection process.

5. A method of controlling a recording media processing device that has a magnetic reading unit that magnetically reads a magnetic ink character recorded on a recording medium,
a storage unit that stores reference waveform data for a plurality of characters and a specific threshold value, and
a character recognition unit that compares character waveform data acquired by the magnetic reading unit reading the magnetic ink character with the reference waveform data read from the storage unit and calculates a difference therebetween, selects a candidate character for the read magnetic ink character based on the difference, and determines whether or not the candidate character is the magnetic ink character based on the difference and the specific threshold,
the control method selecting a candidate character using steps including:
modifying reference waveform data for a plurality of printing methods in plural ways and compares the character waveform data with plural combinations of modified reference waveform data to select the candidate; and
when a character selected as a candidate in at least two combinations is the same character, limiting comparison in at least one remaining combination to the reference waveform data for the same character.

6. The method of a controlling a recording media processing device described in claim 5, further comprising steps of:

selecting the character of the reference waveform data with the smallest difference as a recognition character candidate, when the candidate is determined to not be the magnetic ink character based on the difference and the specific threshold;

executing an additional process of comparing a specific part of the character waveform data and a specific part of the reference waveform data and selecting a candidate for the magnetic ink character; and when the character selected as the candidate in the additional process matches the character selected as the recognition character candidate, determining that the character selected as the recognition character candidate is the magnetic ink character.

7. The method of a controlling a recording media processing device described in claim 5, further comprising steps of:

sequentially executing a total of four selection processes including modifying the reference waveform data in two ways, sliding the reference waveform data and scaling the reference waveform data according to the expansion or compression of the character width of the magnetic ink character, using two sets of reference waveform data, reference waveform data for first printing method and reference waveform data for second printing method, as the reference waveform data for a plurality of printing methods; and if the same character is selected as a candidate in any three of the four selection processes that are executed first based on the reference waveform data for each character, limiting the one selection process remaining of the four selection processes to comparing and processing reference waveform data for the same character.

8. The method of a controlling a recording media processing device described in claim 5, further comprising steps of:

sequentially executing two additional selection processes using a line width scaling process that scales the line width of the reference waveform data according to expansion or compression of the line width of the magnetic ink character, and using two sets of reference waveform data, the reference waveform data for first printing method and the reference waveform data for second printing method, in addition to the foregoing four process combinations; and after executing one of the two additional selection processes using the reference waveform data for each character, limiting the other of the two additional selection processes to the reference waveform data for the character selected as a candidate in the one additional selection process.

9. A non-transitory storage medium storing a program executed by a control unit that controls parts of a recording media processing device that has a magnetic reading unit that magnetically reads a magnetic ink character recorded on a recording medium, a storage unit that stores reference waveform data for a plurality of characters and a specific threshold value, and a character recognition unit that compares character waveform data acquired by the magnetic reading unit reading the magnetic ink character with the reference waveform data read from the storage unit and calculates a difference therebetween, selects a candidate character for the read magnetic ink character based on the difference, and determines whether or not the candidate character is the magnetic ink character based on the difference and the specific threshold, the program selecting a candidate character using steps including:

modifying reference waveform data for a plurality of printing methods in plural ways and compares the character waveform data with plural combinations of modified reference waveform data to select the candidate; and when a character selected as a candidate in at least two combinations is the same character, limiting comparison in at least one remaining combination to the reference waveform data for the same character.

10. The non-transitory storage medium storing a program described in claim 9, further comprising steps of:

selecting the character of the reference waveform data with the smallest difference as a recognition character candidate, when the candidate is determined to not be the magnetic ink character based on the difference and the specific threshold;

executing an additional process of comparing a specific part of the character waveform data and a specific part of the reference waveform data and selecting a candidate for the magnetic ink character; and when the character selected as the candidate in the additional process matches the character selected as the recognition character candidate, determining that the character selected as the recognition character candidate is the magnetic ink character.

11. The non-transitory storage medium storing a program described in claim 9, further comprising steps of:

sequentially executing a total of four selection processes including modifying the reference waveform data in two ways, sliding the reference waveform data and scaling the reference waveform data according to the expansion or compression of the character width of the magnetic ink character, using two sets of reference waveform data, reference waveform data for first printing method and reference waveform data for second printing method, as the reference waveform data for a plurality of printing methods; and if the same character is selected as a candidate in any three of the four selection processes that are executed first based on the reference waveform data for each character, limiting the one selection process remaining of the four selection processes to comparing and processing reference waveform data for the same character.

12. The non-transitory storage medium storing a program described in claim 11, further comprising steps of:

sequentially executing two additional selection processes using a line width scaling process that scales the line width of the reference waveform data according to expansion or compression of the line width of the magnetic ink character, and using two sets of reference waveform data, the reference waveform data for first printing method and the reference waveform data for second printing method, in addition to the foregoing four process combinations; and after executing one of the two additional selection processes using the reference waveform data for each character, limiting the other of the two additional selection processes to the reference waveform data for the character selected as a candidate in the one additional selection process.

* * * * *